United States Patent
Vaughan et al.

(12)

(10) Patent No.: US 6,748,284 B1
(45) Date of Patent: Jun. 8, 2004

(54) FEATURE BASED ASSEMBLY

(75) Inventors: David J F Vaughan, Holywell (GB); Stephen J Gibson, Chester (GB); Ashley A Dillon, Chester (GB)

(73) Assignees: BAE Systems plc, Farnborough (GB); University of Warwick, Coventry (GB)

( * ) Notice: Subject to any disclaimer, the term of this patent is extended or adjusted under 35 U.S.C. 154(b) by 122 days.

(21) Appl. No.: 09/674,308

(22) PCT Filed: Aug. 31, 2000

(86) PCT No.: PCT/GB00/03330

§ 371 (c)(1),
(2), (4) Date: Oct. 31, 2000

(87) PCT Pub. No.: WO01/16658

PCT Pub. Date: Mar. 8, 2001

(30) Foreign Application Priority Data

Aug. 31, 1999 (GB) .............................................. 9920560

(51) Int. Cl.$^7$ .............................................. G06F 19/00
(52) U.S. Cl. ....................................................... 700/97
(58) Field of Search .............................. 700/95, 96, 97, 700/103, 109; 705/7; 702/81, 84

(56) References Cited

U.S. PATENT DOCUMENTS

| | | | |
|---|---|---|---|
| 5,581,466 A | | 12/1996 | Van Wyk et al. |
| 5,586,022 A | * | 12/1996 | Arimoto et al. ............... 700/97 |
| 5,586,252 A | | 12/1996 | Barnard et al. |
| 5,613,047 A | * | 3/1997 | Shimomura et al. ............ 705/7 |
| 5,717,598 A | * | 2/1998 | Miyakawa et al. ............ 700/97 |
| 5,765,137 A | * | 6/1998 | Lee ............................. 700/103 |
| 6,219,805 B1 | * | 4/2001 | Jones et al. .................... 714/38 |
| 2003/0033093 A1 | * | 2/2003 | Nelson ......................... 702/34 |
| 2003/0171897 A1 | * | 9/2003 | Bieda et al. ................. 702/185 |

FOREIGN PATENT DOCUMENTS

| | | |
|---|---|---|
| EP | 0 819 996 | 1/1998 |

OTHER PUBLICATIONS

Bhimavarapu K et al.: "Performance–Based Safety Standards: An Integrated Risk Assessment Program" ISA Tech/Expo Technology Update, US, Instrument Society of America, Salem, MA, vol. 1, No. Part 04, 1997, pp. 11–20.
Hamilton D L et al.: "Risk and Fault Tolerance Analysis for Robotics and Manufacturing" Melecon. Mediterranean Electrotechnical Conference, US, New York, IEEE, vol. Conf. 8, 1996, pp. 250–255.
Cheng Leong Ang et al: "IDEFO Modelling for Project Risk Assessment" Computers in Industry, NL, Elsevier Science Publishers. Amsterdam, vol. 22, No. 1 (Jun. 1993) pp. 31–45.
Summers A E: "Techniques for assigning a target safety integrity level" ISA Transactions, US, Instrument Society of America. Pittsburgh, vol. 37, No. 2, (Apr. 1998) pp. 95–104.
Fend C–X et al.: "Constraint–Based Design of Parts" Computer Aided Design. GB, Elsevier Publishers BV. . Barking, vol. 27, No. 5 (May 1995) pp. 343–352, ISSN: 0010–4485.
Bordegoni M. and Cugini U.: "Feature–Based Assembly In Aeronautics Design: From Concepts Development to Formalization" International Journal of Vehicle Design, vol; 21, No. 2/3, (Mar. 1999) pp. 228–242.

* cited by examiner

*Primary Examiner*—Leo Picard
*Assistant Examiner*—Ryan Jarrett
(74) *Attorney, Agent, or Firm*—Nixon & Vanderhye P.C.

(57) ABSTRACT

A method of design and manufacture of an assembly of components including selecting KCs of the type, Product KCs, Assembly KCs or Manufacturing KCs is provided. The method includes the steps of identifying potential KCs and carrying out a risk assessment for variation of the potential KCs based upon four values, namely probability of failure or variation; the severity of the variation; the detectability of the variation, and the repairability of the variation. Scores attributed to each said value may then be multiplied together to produce the risk assessment. Once the KCs have been selected, a process of feature identification and classification for the KC may be carried out, followed by establishment of assembly precedence of features for the KC.

17 Claims, 11 Drawing Sheets

Inboard Leading Edge structure

Fig.2.
Key Characteristic Interactions

Fig.3.

Showing Identified Key Characteristics

Fig.4.

Section Spar to Track Rib4 Attachment

Fig.6.
Track rib 4 Datum structures

Fig.7.

Datum Structure

Some parts are drawn and dimensioned about datums which are not actually on or near the part, have no relevance to the assembly and are not used for inspection

Fig. 8.

FEATURE BASED RECOGNITION ON TRACK RIB 4 INBOARD

PART NAME: RIB OUTBOARD TRACK RIB 4
DATE: 1-Sept-1999

FEATURE INFORMATION

| Feat Num | Type | Name | Tols | Paths |
|---|---|---|---|---|
| Processes Sub-Features | | | | |
| 701 | PLANE | | 2 | |
| 702 | PLANE | | 4-5 | |
| 703 | PLANE | | 8 | |
| 704 | HOLE | | 9 | |
| 705 | PLANE | | | |
| 706 | HOLE | | 10 | |
| 707 | HOLE | | 11 | |

OD: Offset Defined   OU: Offset Used   ODU : O Defined and Used

Fig.9.

FEATURE AND TOLERANCE TRACK RIB 4 INBOARD

| Num | Tolerance String | Feature | Features to be measured | | Name |
|---|---|---|---|---|---|
| 1 | A | 701 | | PLANE | TR4_WB_OB_FCE |
| 2 | FLT;0.2 | 701 | 701 | | |
| 3 | B | 702 | | PLANE | TR4_OB_FL |
| 4 | PER;0.1;A | 702 | 701-702 | | |
| 5 | C | 703 | | | |
| 6 | SPF;0.197;A;B | 703 | 703 | PLANE | TR4_OB_UPR_FL |
| 7 | POS;DIA 0.076;A;B;C | 704 | 701-704 | HOLE | TR4_OB_HL2 |
| 8 | SPF 0.508;A;B | 705 | | PLANE | TR4_OB_LWR_FL |
| 9 | POS;DIA 0.076;A;B;C | 706 | 701-703,706 | HOLE | TR4_OB_HL3 |
| 10 | POS;DIA 0.030;A;B;C | 707 | 701-703,706 | HOLE | |
| 11 | D | 707 | 701-703 | HOLE | TR4_FL_IN_HLA |

Risk Analysis Matrix - Track Rib 4 to Spar

| Candidate Key | Cause of Variation | OCC | SEV | Detect (Repair) | Total | Repair Total | Key |
|---|---|---|---|---|---|---|---|
| AERODYNAMICS | INSTALLATION TO SPAR | | | | | | |
| | Wz0 Location to Spar | 5 | 7 | 2 | 5 | 70 | 350 | Y |
| | TRACK RIB SUB ASSEMBLY | OCC | SEV | Detect (Repair) | Total | Repair Total | Key |
| Selected for Analysis | Outbd Co-ord Hole to Upper Surface | 4 | 4 | 4 | 6 | 64 | 384 | Y |
| | Girth across Spreader Plates | 6 | 2 | 4 | 4 | 48 | 192 | Y |
| | Girth across Joint Angle/Strap | 7 | 6 | 4 | 6 | 168 | 1008 | Y |
| | 'MATCHED PAIR' RIB DETAIL | OCC | SEV | Detect (Repair) | Total | Repair Total | Key |
| | Lower Profile (Wz) | 6 | 7 | 5 | 6 | 210 | 1260 | Y |
| | Upper Fwd Cut out Profile | 3 | 8 | 5 | 6 | 120 | 720 | Y |
| | UPPER SPREADER PLATE | OCC | SEV | Detect (Repair) | Total | Repair Total | Key |
| | Thickness | 5 | 7 | 1 | - | 35 | -Repair Not Viable- | Y |

FEATURE BASED ASSEMBLY

BACKGROUND OF THE INVENTION

1. Field of the Invention

This invention provides a practical approach to Feature Based Assembly, in particular as applied to an aircraft and here as an example as applied to a leading edge section of an aircraft wing. The term Feature Based Assembly will be understood by those skilled in the art.

2. Discussion of Prior Art

An effective product introduction process of the invention enables top-level customer requirements to be embedded into the design. Feature Based Assembly captures important component relationships within the design and subsequent assembly. Transformation of these Key Characteristics (KCs) into the final assembly requires an intimate understanding at the part feature level. A physical feature based assembly demonstrator has been developed, characterised by part to part assembly.

SUMMARY OF THE INVENTION

The invention seeks to simplify the assembly process. Today's wing designs have evolved incrementally with the launch of each new aircraft variant, but essentially the philosophy of gradual improvement in design and assembly has resulted in minimal change. If major savings are to be achieved then new approaches must be adopted. The applicant commenced on a program of lean manufacturing studies to produce a physical wing assembly demonstrator reducing costs through Feature Based Assembly. This program of work created a consistent Feature Based methodology, ultimately simplifying the process. Feature Based Assembly is here applied to a wing inboard leading edge. The process of the invention covers initial customer requirements and design, supply and manufacture. Particular emphasis is on creating a closed loop between design, manufacture and assembly. Today's practices are labour intensive, relying on critical dimensions and fixed expensive tooling. It is demonstrated that a new design, manufacture and assembly process can be derived from recognising important component features and dealing with them in a new way.

DETAILED DISCUSSION OF EMBODIMENTS

The Project

Figure 1A:
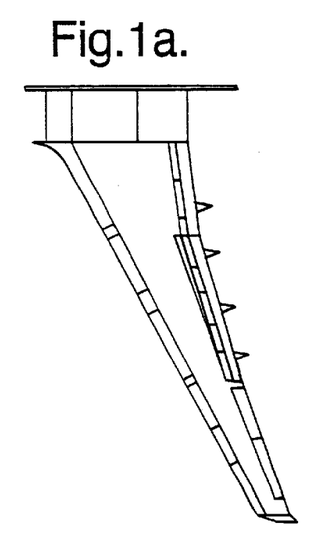
FIG. 1(a) is a top plan view of a wing.
Figure 1B:
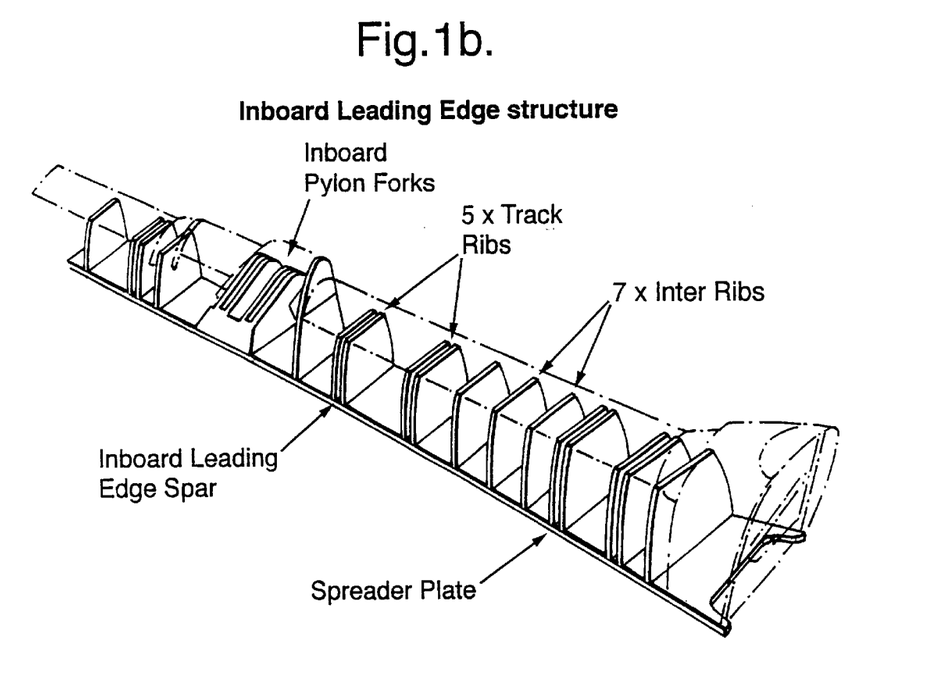
FIG. 1(b) is a perspective view of the underlying structure of the leading edge of the wing in FIG. 1(a)

The complete wing box was broken down until a specific area, that of a simple attachment of Spar to Track Rib 4 assembly, was selected to demonstrate the principle, see FIG. 1.

Key Characteristics

KC identification is essential in determining which product features, manufacturing process parameters and assembly process issues most significantly affect the product's performance function and form. It is customary to classify the KCs into three different types within engineering functions. In use on the shopfloor, no such distinction is normally made.

Product Key Characteristics (PKCs) are a product's geometric features and material properties that are highly constrained or for which minute deviations from nominal specifications (regardless of manufacturing capability) have a significant impact on the product's performance, function and form at each product assembly level.

Assembly Process Key Characteristics (AKCS) are the features during each assembly stage on the product, tool or procedure that significantly affect the realisation of a product KC at the next higher assembly process level during the assembly process.

Manufacturing Process Key Characteristics (MKCs) are the manufacturing machine process parameters and/or workplace fixturing features for machine tools and equipment that significantly affect the realisation of a product or an assembly process KC at the part feature level.

Figure 7:
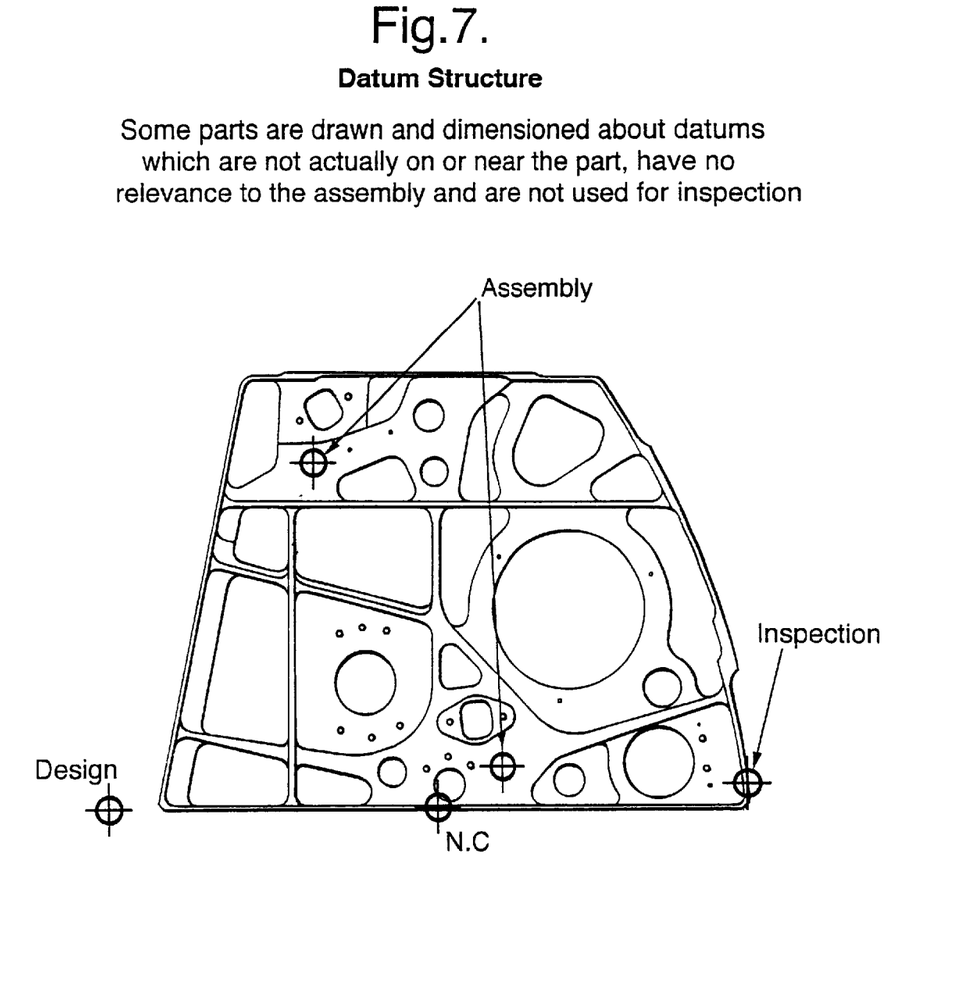
FIG. 7 is a side view of the structure shown in FIG. 3 indicating datum points.

At present there is a decrease in reliance on drawings; we are in a 3D world. A single digital product model is often used, with concurrent engineering and design build teams. Software tools such as Valysis to promote tolerance management are used. Industry alliances with global manufacturing process capability often apply; and costing is so closely controlled that there is no margin for error. In the field of datum structures often there is no common datum structure as details progress to assemblies and key features of components change as the component becomes an assembly. Often parts are drawn and dimensioned about datums which are not actually on or near the part, have no relevance to the assembly and are not used for inspection, see FIG. 7.

Figure 10:
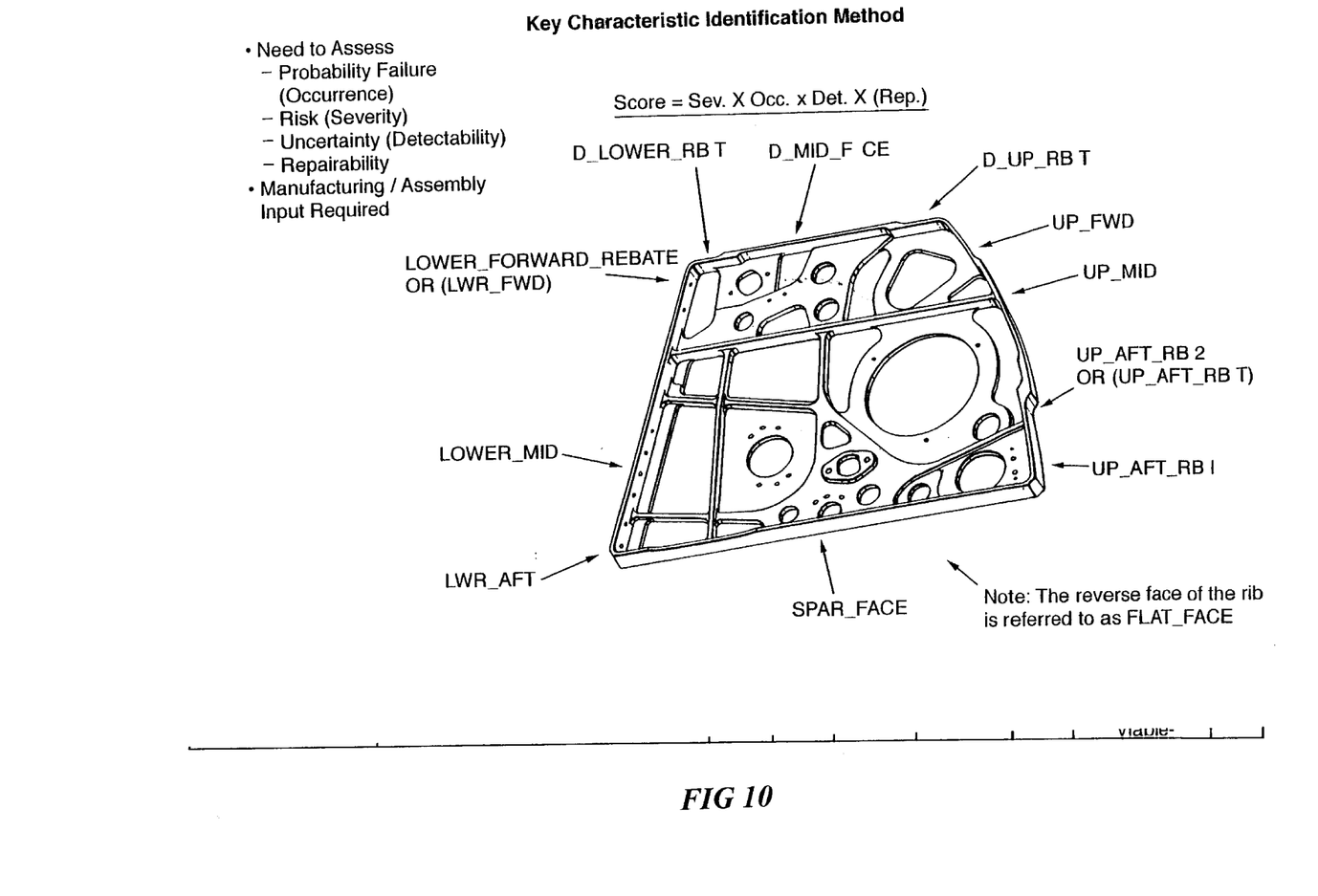
FIG. 10 is a perspective view of the structure shown in FIG. 3 illustrating key characteristic identifications.

According to one aspect of the invention there is provided a method of selecting KCs (whether Product, Assembly or Manufacturing KCs) including the steps of identifying potential KCs and carrying out a risk assessment for variation of the KCs preferably including four values, namely probability of failure or variation; the severity of the variation; the detectability of the variation, and the repairability if variation occurs. Scores attributed to each value are then preferably multiplied together to produce the risk assessment, see FIG. 10.

According to a second aspect of the invention, once the KCs have been selected the invention includes carrying out a process of at least one of the steps of assembly feature identification for the KC, assembly feature classification for the KC and establishment of assembly precedence of assembly features for the KC.

It is envisaged that the management of the design, manufacturing, assembly and inspection processes, according to the invention, can be carried out by addressing the CAD design engineering process, by creating a digital production data set and by creating a feedback mechanism for the manufacturing and assembly process.

The invention can provide extremely beneficial tolerance management in aircraft OEMs and the supply chain. For example, roughing machine shops can be used to create parts or surface finish on parts which are not affected by KCs.

The invention can provide an enormous reduction in the use of hard gauges with the use of feature based part to part assembly. This can lead to reduction in floor space used in the factory and the use of simple low cost jigs. A more consistent process will also result with reduction in time-consuming fettling operations and the elimination of unnecessary assembly operations. Additionally greater ease of assembly can result together with a more consistent product. Focus can transfer to major process improvements and to solving root causes rather than just treating symptoms.

The invention will be further described by way of example below.

Figure 2:
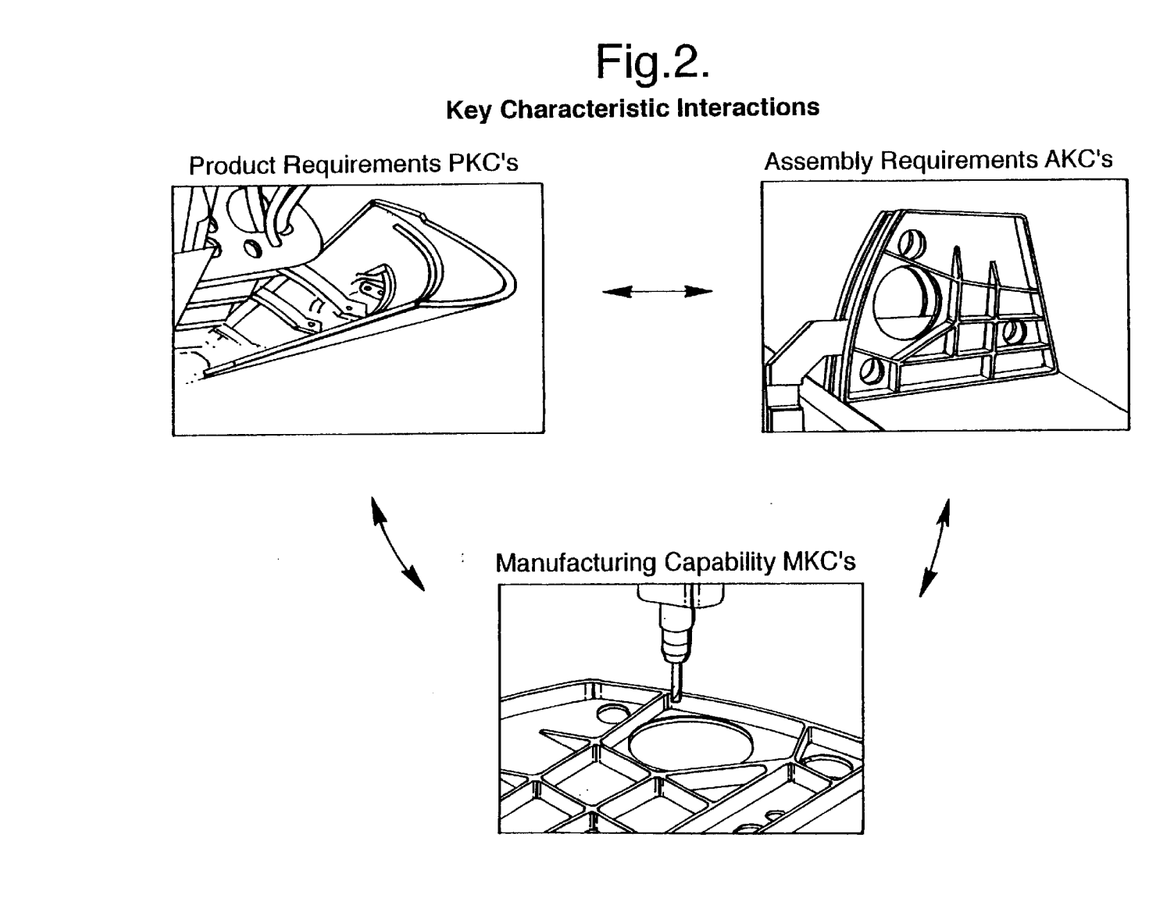
FIG. 2 is a sequence view of key characteristic interactions in accordance with the present invention.

Whilst it is essential to achieve the Product KCs, this should not be at the expense of the Assembly or Manufacturing KCs. If the design is completed with little or no reference to assembly and manufacturing requirements, the product will be expensive to manufacture and will typically have significant build quality problems in manufacture and assembly. The three types of KCs are all mutually dependant and any change in one will normally affect the other two categories, see FIG. 2. The recognition of this fact is essential to the invention.

KCs are essentially permanent for a given design and can be identified on product, fixture and tool drawings; however it must be noted that changes in the design or build process can change the KCs. The MKCs are directly associated with the physical creation of PKCs, based on the manufacturing process selected. Interactions between the three KC types must be determined and assessed concurrently. Thus it is essential that the identification of KCs be completed at an early stage of the design process using multi-functional design-build teams.

Choice of KCs Based on Risk Analysis

The project limited the PKCs to those which affect the aerodynamic requirements of the leading edge. These include factors relating to wing shape, profile, steps and gaps and surface smoothness. A number of top-level aerodynamic requirements were chosen. The choice of KCs is decided upon on a basis of economical justification, normally following from risk analysis. The assessment process results in quantification of four values: probability of failure (occurrence), risk (severity), uncertainty (detectability) and repairability. Based on these parameters, the design build team can make decisions about the most effective action. A risk analysis matrix was used.

The weighting factors were based on design understanding as well as current knowledge of our manufacturing process capabilities and type of equipment likely to be used for each manufacturing/assembly task. Thus, if an old unreliable piece of equipment was being used, the occurrence weighting was raised as a defect/concession was more likely than using a newer more capable machine. A robust design according to the invention will make the KCs less sensitive to manufacturing process variation. This process change reduces the input variation, and process improvements adjust current processes to reduce the input variation; statistical process control (SPC) monitors the existing manufacturing process to prevent degradation and inspection can be used to identify scrap or rework parts.

The further up the design chain a strategy can be identified and implemented, the more cost effective the solution will be throughout. It is therefore essential that full manufacturing and assembly contribution is gained at the concept and initial design stages.

Figure 3:
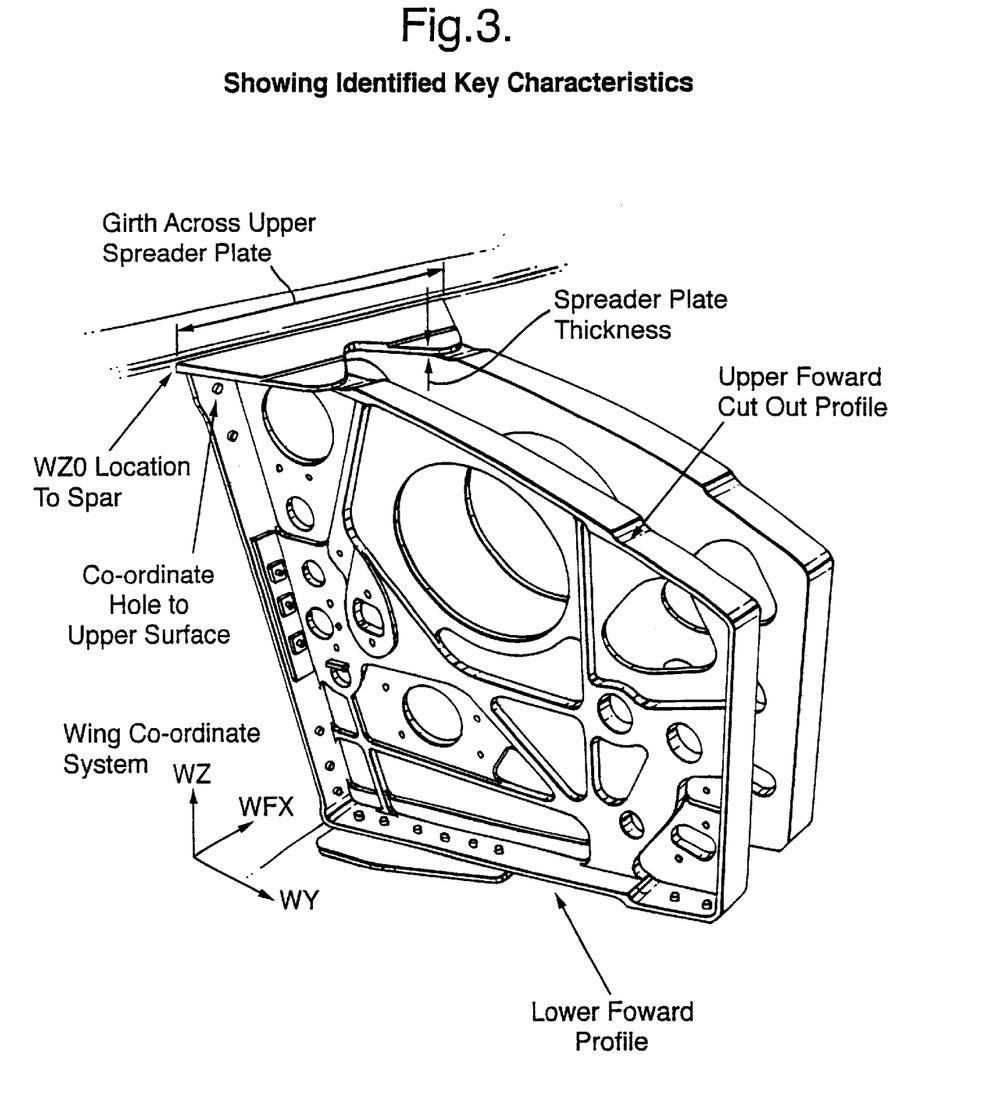
FIG. 3 is a perspective view showing identified key characteristics of the structure.
Figure 11:
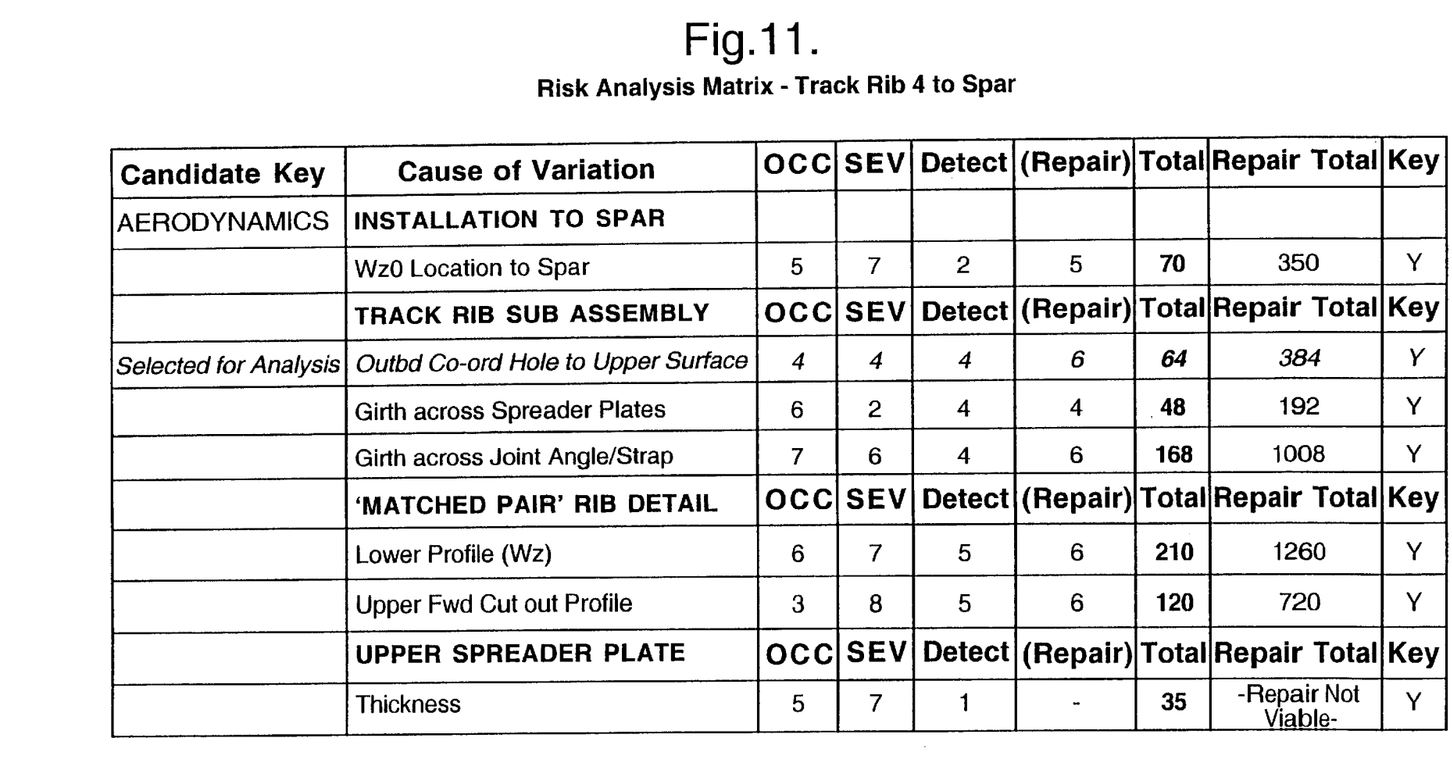
FIG. 11 is a table providing a risk analysis matrix in accordance with the present invention.

An outcome of the KC risk analysis was the identification of the co-ordinate hole to the upper surface, (Table 1 in FIG. 11, FIG. 3, FIG. 4) as a PKC. This characteristic essentially controls the step and gap requirement, realising the fundamental aerodynamic profile of the wing. It is this key feature which will be analysed in greater detail. A component feature can be described as:

"A special collection of geometric elements and functional characteristics, logically grouped together"

Figure 8:
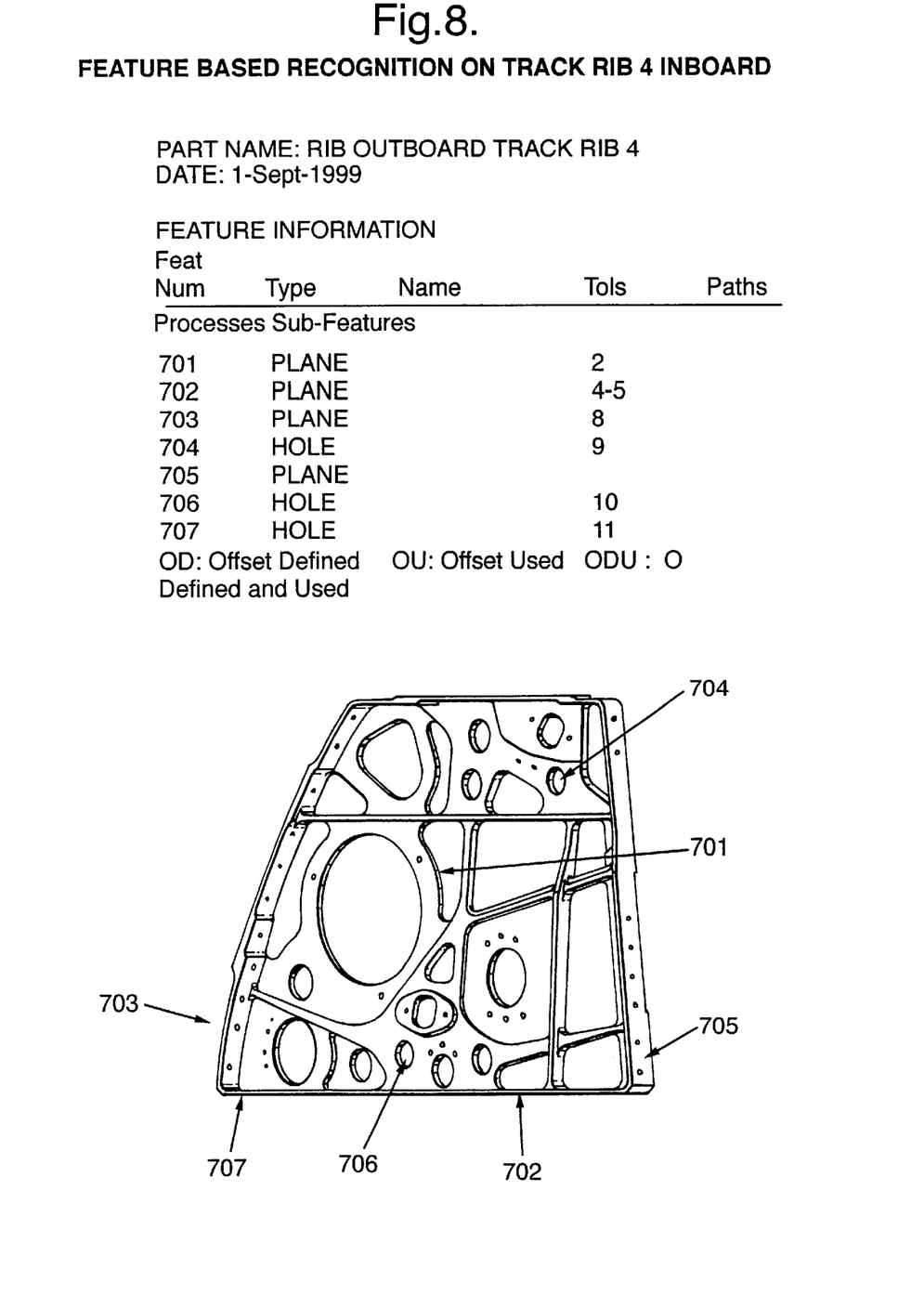
FIG. 8 is a perspective view of the structure shown in FIG. 3 illustrating feature based recognition.
Figure 9:
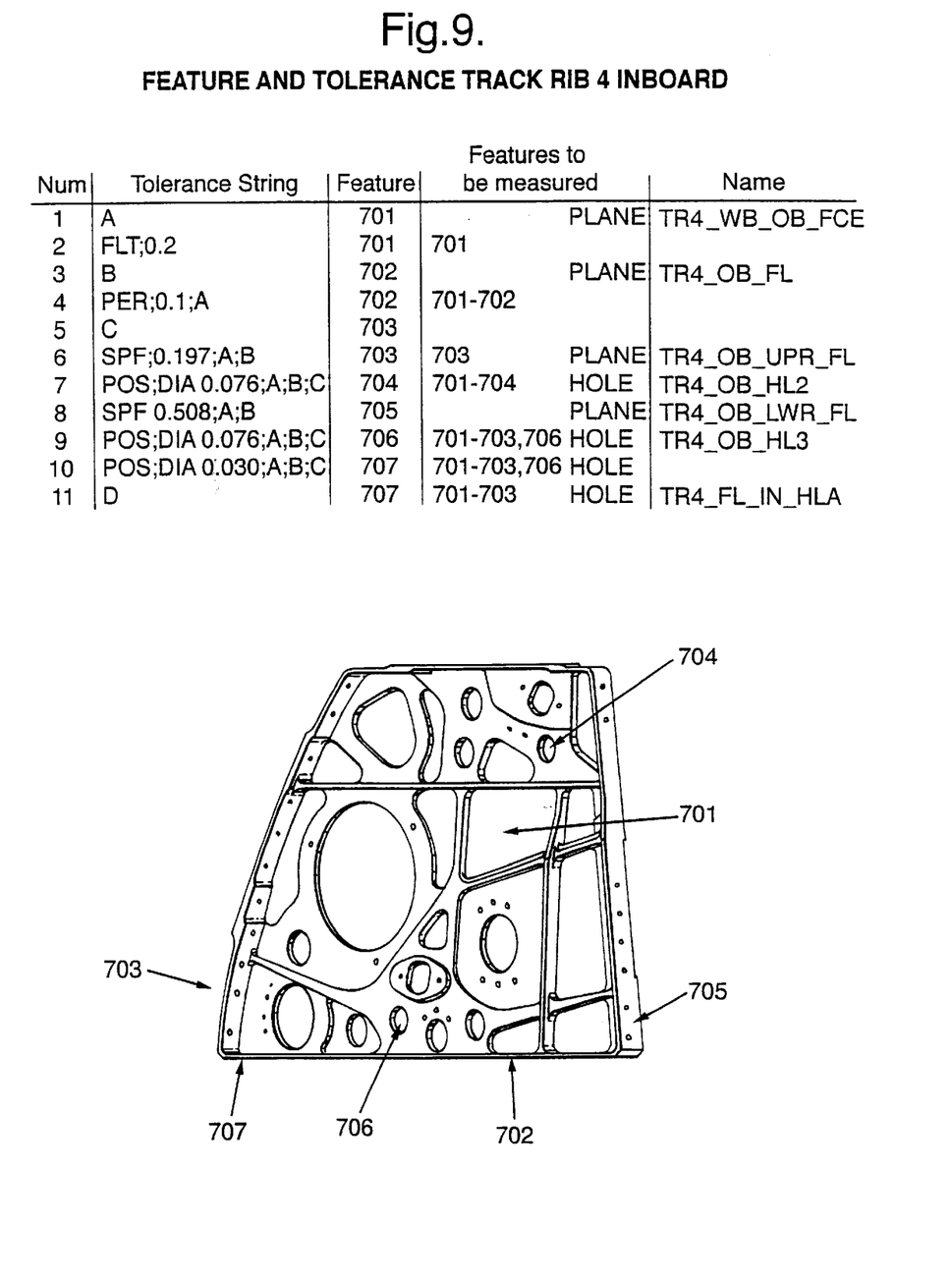
FIG. 9 is a perspective view of the structure shown in FIG. 3 illustrating feature and tolerance track for the structure.

Feature Based Assembly overcomes the limitations of pure geometry creation by providing a richer picture. Designers think in features intuitively, but capturing and conveying this information is a non-trivial exercise. Historically, tolerances assigned to components are based upon designer experience. Feature Based recognition provides an ideal medium to explicitly communicate and articulate PKCs into the final assembly. Its foundation is geometric dimensioning and tolerancing at the detail stage, see FIGS. 8 and 9. In this manner the number of datum structures derived throughout the design, machining and inspection stages can be agreed. This eliminates ambiguity, by assembling to key features. A methodology is set out below.

Feature Identification

A feature identification process was developed. When two parts are related, it is possible to define an area on each part involved in the assembly. These two areas need to have matching features, so that they can be assembled. Therefore, the relationship between two part features is termed an assembly feature. To attain this level of detail a classification system is required, in this case based upon the attachment of Track Rib 4 to the spar (shown in bold).

Assembly Feature Classification

Figure 4:
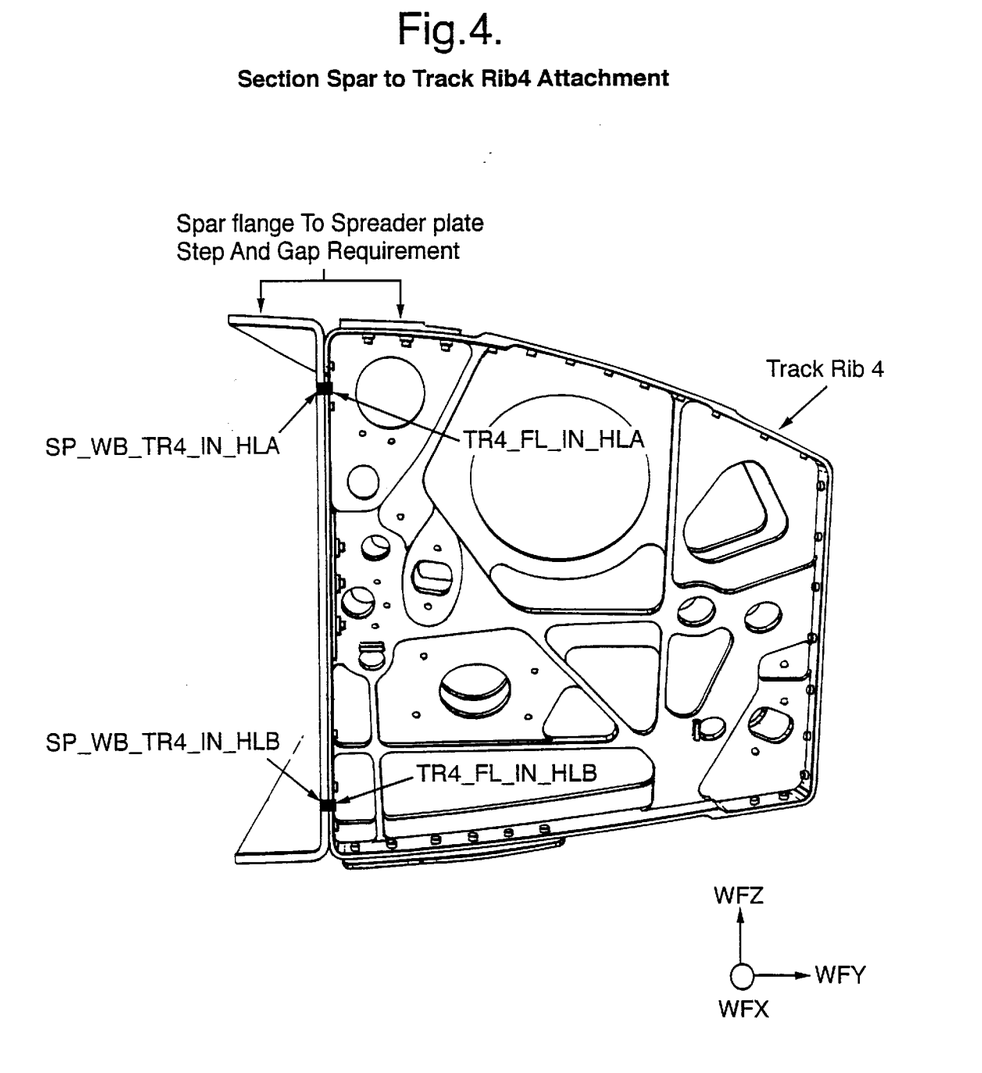
FIG. 4 is a side view of the component shown in FIG. 3.

What is regarded as a particularly important aspect of the invention comprises a feature classification system which was developed as a hierarchical structure or database. This system communicates design intent into assembly and provides a practical method by which the overall process can be realised. Reference is made to FIG. 4 in this section.

Level 1 Domain: Gives an understanding of which families of components are to be joined in the assembly. Structure/Structure. Other options are Structure/Tooling or Structure/Systems.

Level 2 Problem to be solved: attach. Describes the assembly relationship.

Level 3 Specific situation: ⊥ Describes the type of spatial orientation and relationship of components.

Level 4 Assembly principle: ⌴ Describes in detail the specific geometry.

Level 5 Possible technological solution: glue, bond, fasten. Describes how these parts are assembled.

Level 6 Detailed choice: bolted, welded.

Technical attributes of assembly feature: cost, time, or positioning in assembly precedence.

Design constraints: this is a fuel tank boundary.

Key to component identification (see FIG. 4): Track Rib 4=TR4; Spar=SP; Inboard=IN; Flange=FL; Web=WB; Hole A=HLA; Hole B=HLB;

Needed part feature per component: rib has a flange to attach to a spar web

TR4_FL_IN/SP_WB_TR4_IN

Description feature—classification name: attach

TR4_FL_IN_HLA/SP_WB_TR4_IN_HLA

Links between part features: attach track rib 4 flange hole A, to spar web hole A

TR4_FL_IN_HLA/TR4_FL_IN/BOLTS/
SP_WB_TR4_IN/SP_WB_TR4_IN_HLA

Fixing agent attributes: fastener type HLT 900, specification

Applicability—types of components: rib_spar or stringer_skin or skin_spar

Assembly means—type of tooling required: fastened manual or automated.

Once these features have been identified, they can then be assigned to the structure and an assembly build tree or feature assembly precedence created.

Feature Assembly Precedence

Figure 5:
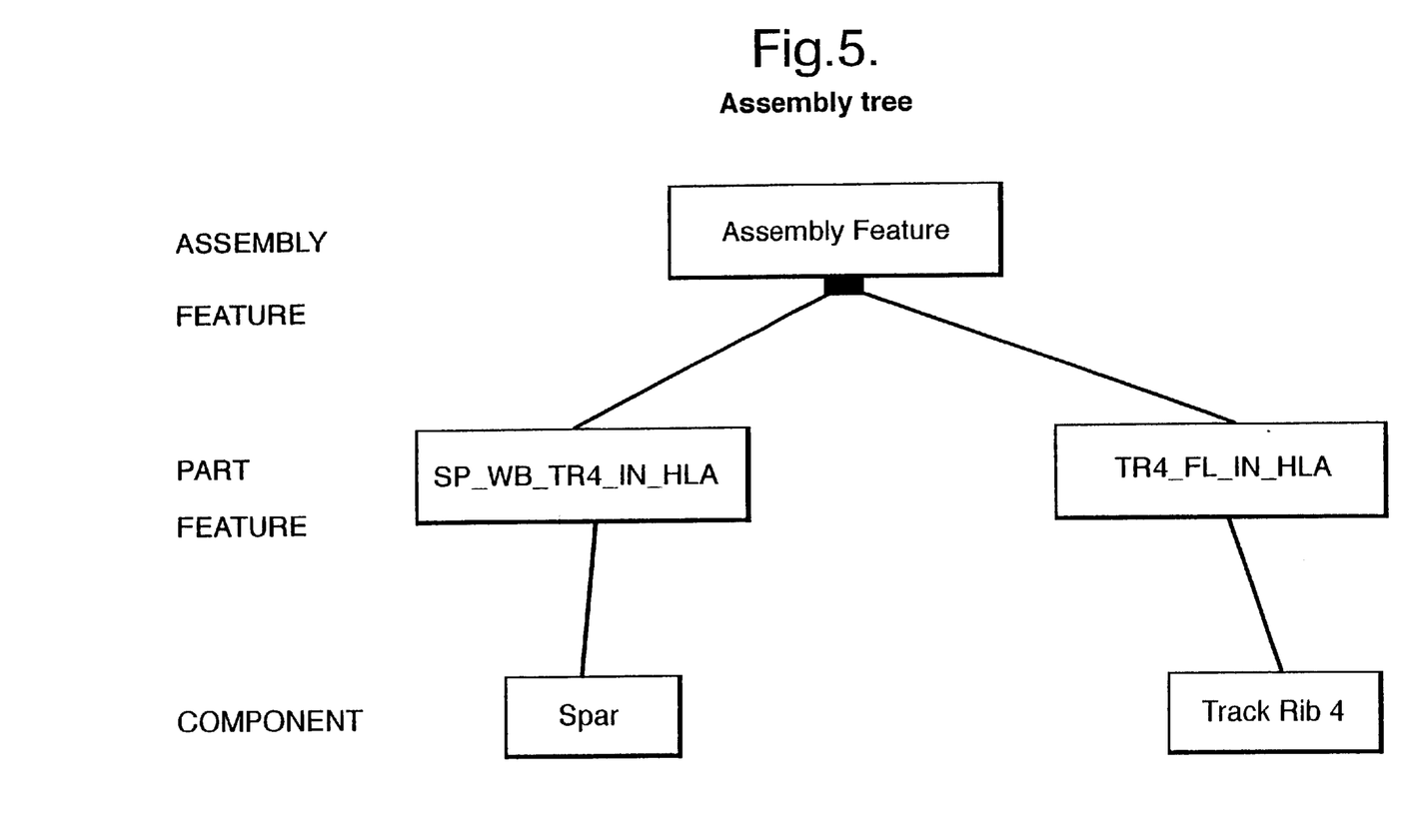
FIG. 5 is a block diagram of an assembly tree in accordance with the present invention.

Having created the feature identification and classification process, a requirement still exists to transform this information into a meaningful feature assembly precedence, as depicted in FIG. 5, which demonstrates the alignment of the spar and track rib holes A and B and then secondly, the spar web to track rib flange.

The Process Sheet

By understanding the assembly sequence a process sheet declares the object target relationship, constraining the six degrees of freedom, in relation to the wing axis system i.e. WTZ=Translation in Z, WRZ=Rotation in Z.

| OBJECT | PRIMARY | SECONDARY | TERTIARY |
|---|---|---|---|
| TRACK RIB 4 TARGET | TR4_FL_IN_HLA | TR4_FL_IN_HLB | TR4_IN_FL |
| SPAR AT TRACK RIB 4 | SP_WB_TR4_IN_HLA | SP_WB_TR4_IN_HLB | SP_WB_TR4_IN |
| DEGREES OF FREEDOM CONSTRAINED | WTZ WTX WRX WRZ | WRY | WTY |

It is shown that the top level PKC positioning of the spar and track rib upper co-ordinate hole A has been realised through feature classification, assembly tree modelling and assembly sequencing.

Process Capability

Figure 6:
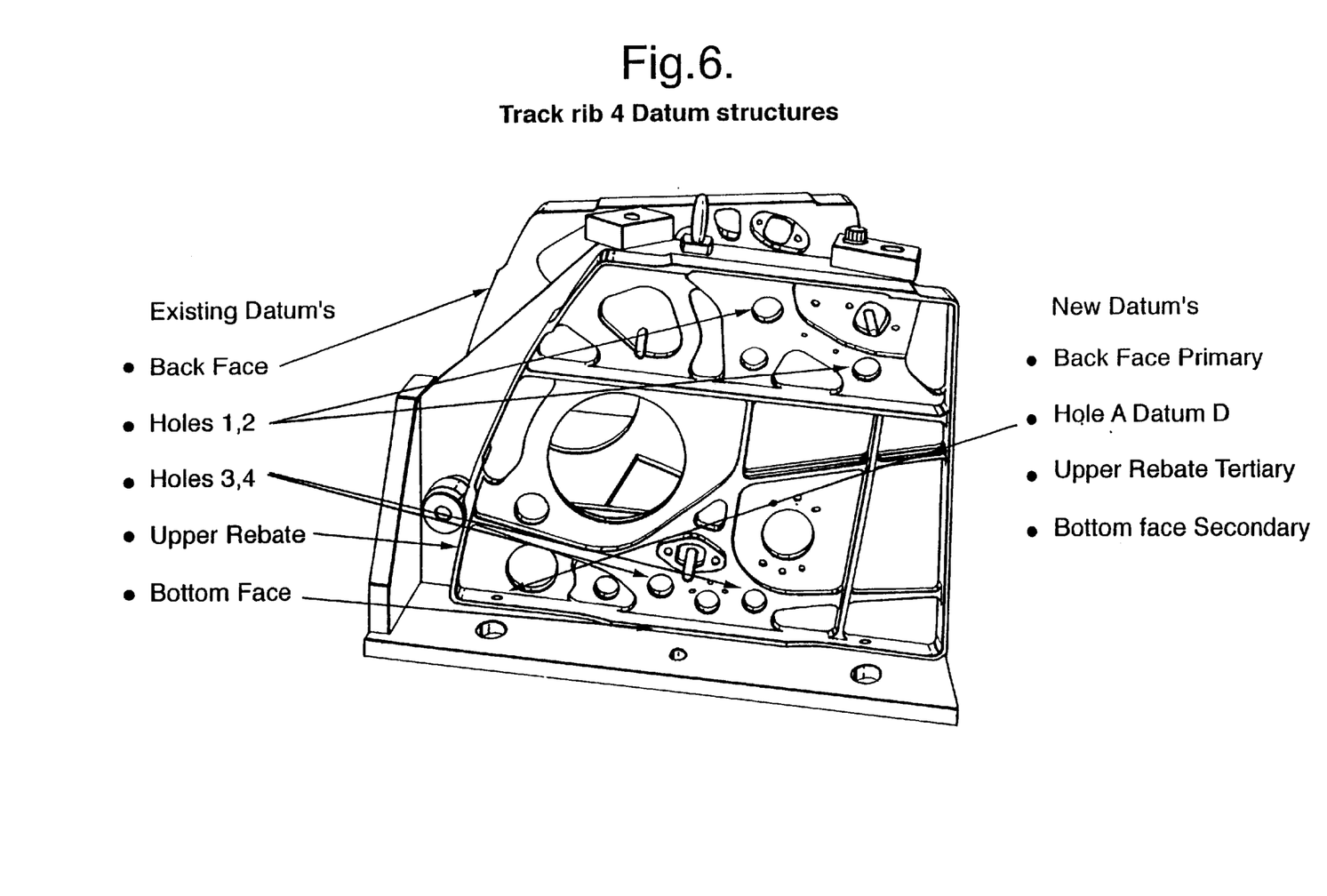
FIG. 6 is a side perspective view of the structure of FIG. 3.

The transfer of the KC and Feature Based techniques to the shop floor must begin in the machine shop. Once a part is produced consistently to the nominal tolerance value with minimal variation then the work can continue in the assembly areas. The first task that is required is to ensure that the datum structure defined by consultation with the design department is maintained throughout the process. It was identified that, during the production of the track rib, five datum set-ups had been used, see FIG. 6. Once the tool designers, planners and manufacturing engineers started to utilise the same datums then the variation in location of the part in different processes was minimised.

Statistical process control for KCs can be justified with the following reasoning:

Gaining an understanding of the reason for any current variation.

Giving direction to engineering process improvement.

Reduction in the cost of implementation of SPC by targeting only areas that affect fit, form and function, based on the need to control only KCs.

Giving a process for the reduction of inspection by focusing on KCs only.

Achieving significant reduction in manufacturing assembly lead times through elimination of tolerance stack up issues Feature Based Assembly provides the fundamental path by which the use of SPC can be employed in the identification and control of variance. The key features are the largest contributors to variation and so if they can be monitored and controlled then the benefits can be seen in a simplified assembly process. The level of control was critical within this project with limits of positional accuracy of 0.03 mm for spar and track rib holes A and B, as defined by tolerance analysis work undertaken using a Tecnomatix Valysis Assembly (TVA) software package. This gave the limits that would be acceptable on assembly for the design intent to be met. This was achieved with a Bridgeport 3 axis high speed milling machine. A second benefit was with the interpretation of the measurement data within the Tecnomatix Valysis computerised measuring machine (CMM) software package. This allowed for the measurement data to be compared with a nominal toleranced CAD model. The major benefit this allows is that the data can be restrained or released in any nominated degree of freedom, unlike most CMM's. Once a best fit is agreed this can then be transferred straight into TVA and the best fit for the assembly obtained. The results that were obtained were with process changes. The capability measures for the worst component was increased up to a CPK of 1.3. This closed the specification to process to product quality loop.

Wing Assembly Demonstrator

The demonstrator consisted of a spar 5 m long, with two slat track ribs, single rib and an engine pylon. Having optimised the assembly sequence, new aluminium modular tooling was introduced, reducing costs and complexity. As both spar and track ribs had been pre-drilled to the predetermined tolerances, part to part assembly was achieved. Verification of a theoretical CAD model to the physical demonstrator was achieved with a Leica LTD500 laser tracker system.

The use of KCs encourages and indeed forces the design build team to actively consider process capability and robust design and manufacturing processes. The process of the invention benefits most from a consistent datum structure. Without such a structure, the resulting geometry will be difficult to assemble and large amounts of adjustment on assembly and reworking will be required. Feature Based Assembly captures and controls the important few features which contribute most to variation in an assembly. The design can then be de-sensitised to the actual manufacturing variation (i.e. known statistical process data) by simulating process, design, assembly method and geometry changes. By predicting the various part assembly processes, costly errors will not be locked into the design.

Some key messages arising from the project are:

Establish a robust tolerance management process;

Create an infrastructure to support the management of variation of KCs;

Continue monitoring and measuring as production continues;

Establish consistency of tolerancing and datums.

What is claimed is:

1. A method of design and manufacture of an assembly of components including selecting key characteristics of the type, product key characteristics, assembly key characteristics or manufacturing key characteristics, the method including the steps of identifying potential key characteristics and carrying out a risk assessment for variation of the potential key characteristics based upon four values, namely probability of failure or variation; the severity of the variation; the detectability of the variation, and the repairability of the variation.

2. A method as in claim 1 in which scores attributed to each said value are multiplied together to produce the risk assessment.

3. A method as in claim 1 including, once the key characteristics have been selected, carrying out a process of part feature identification for the key characteristic.

4. A method as in claim 3 including carrying out a process of assembly feature identification for the key characteristic.

5. A method as in claim 4 including carrying out a process of assembly feature classification for the key characteristic to communicate design intent into the assembly process.

6. A method as in claim 5 in which the process of assembly feature classification includes creating a hierarchiacal structure or database.

7. A method as in claim 4, including establishment of assembly precedence of the assembly features for the key characteristic.

8. A method as in claim 1 including statistically measuring process capability and feeding back the measurements to modify the method as desired.

9. A method as in claim 8, including measuring at least one of identified part features and assembly features.

10. A method as in claim 9 including measuring the selected key characteristic.

11. A method of design and manufacture of an assembly of components including selecting key characteristics of the type, product key characteristics, assembly key characteristics or manufacturing key characteristics, the method including the steps of identifying potential key characteristics and carrying out a risk assessment for variation of the potential key characteristics based upon three values, namely probability of failure or variation; the severity of the variation and the detectability of the variation, carrying out a process of part feature identification for the selected key characteristic, carrying out a process of assembly feature identification for the selected key characteristic and establishing an assembly precedence of the identified assembly features for the key characteristic which communicates design intent into the assembly process.

12. A method as in claim 11 including additionally carrying out the risk assessment based upon the repairability of the variation.

13. A method as in claim 11 in which the step of establishing an assembly precedence includes carrying out a process of assembly feature classification for the key characteristic.

14. A method as in claim 13 in which the process of carrying out the process of assembly feature classification includes creating a hierarchical structure or database.

15. A method as in claim 11 including statistically measuring process capability of the method and feeding back the measurements to modify the method as desired.

16. A method as in claim 15 including measuring at least one of identified part features and assembly features.

17. A method as in claim 16 including measuring the selected key characteristic.

\* \* \* \* \*